United States Patent
Edler Von Koch

(10) Patent No.: US 10,152,311 B2
(45) Date of Patent: Dec. 11, 2018

(54) CODE-SIZE AWARE FUNCTION SPECIALIZATION

(71) Applicant: Qualcomm Innovation Center, Inc., San Diego, CA (US)

(72) Inventor: Tobias Edler Von Koch, Austin, TX (US)

(73) Assignee: QUALCOMM Innovation Center, Inc., San Diego, CA (US)

( * ) Notice: Subject to any disclaimer, the term of this patent is extended or adjusted under 35 U.S.C. 154(b) by 26 days.

(21) Appl. No.: 15/268,014

(22) Filed: Sep. 16, 2016

(65) Prior Publication Data
US 2017/0242670 A1 Aug. 24, 2017

Related U.S. Application Data

(60) Provisional application No. 62/296,859, filed on Feb. 18, 2016.

(51) Int. Cl.
G06F 8/41 (2018.01)

(52) U.S. Cl.
CPC .................. *G06F 8/4434* (2013.01)

(58) Field of Classification Search
CPC ............ G06F 8/40–8/49; G06F 8/443–8/4443
See application file for complete search history.

(56) References Cited

U.S. PATENT DOCUMENTS

| | | | | |
|---|---|---|---|---|
| 6,314,562 | B1* | 11/2001 | Biggerstaff | G06F 9/4443 717/144 |
| 7,890,941 | B1* | 2/2011 | Garud | G06F 8/443 712/228 |
| 2004/0117760 | A1* | 6/2004 | McFarling | G06F 8/443 717/101 |
| 2006/0130020 | A1* | 6/2006 | Abdullah | G06F 8/54 717/140 |

(Continued)

OTHER PUBLICATIONS

J. Eugene Ball. "Predicting the effects of optimization on a procedure body". In Proceedings of the 1979 SIGPLAN symposium on Compiler construction (SIGPLAN '79). ACM, New York, NY, USA, 214-220.*

(Continued)

*Primary Examiner* — Chameli Das
*Assistant Examiner* — Joanne G Macasiano
(74) *Attorney, Agent, or Firm* — Neugeboren O'Dowd PC

(57) ABSTRACT

A method for compiling software code comprises scanning call sites within the code to identify a function that is called with at least one constant argument and creating a list of each call site associated with the function and sets of constant arguments passed to the function. If any common subsets of the constant arguments are shared across a plurality of call sites, a size of the function is estimated. selecting any sets of constant arguments that are used only in one call site. The sizes of specialized functions covering sets of constant arguments that are used in only one call site is estimated. The method comprises creating a first set of (Continued)

specialized versions of the function covering one or more sets of constant arguments that are used in only one call site, and if any common subsets of the constant arguments exist, creating a second set of specialized versions of the function.

20 Claims, 6 Drawing Sheets

(56) References Cited

U.S. PATENT DOCUMENTS

| | | | |
|---|---|---|---|
| 2009/0222791 A1* | 9/2009 | Togawa | G06F 8/4442 717/106 |
| 2012/0311546 A1* | 12/2012 | Fanning | G06F 8/49 717/136 |

OTHER PUBLICATIONS

Schwarz, Benjamin, et al. "Plto: A link-time optimizer for the Intel IA-32 architecture." Proc. 2001 Workshop on Binary Translation (WBT-2001). (Year: 2001).*

Debray, Saumya K., et al. "Compiler techniques for code compaction." ACM Transactions on Programming languages and Systems (TOPLAS) 22.2 p. 378-415. (Year: 2000).*

* cited by examiner

CODE-SIZE AWARE FUNCTION SPECIALIZATION

PRIORITY

The present Application for Patent claims priority to Provisional Application No. 62/296,859 entitled "CODE SIZE-AWARE FUNCTION SPECIALIZATION" filed Feb. 18, 2016, and assigned to the assignee hereof and hereby expressly incorporated by reference herein.

FIELD OF THE DISCLOSURE

The present disclosure relates generally to compiling programs of high-level languages, and more specifically to compile-time operation of high-level languages.

BACKGROUND

Compilation is a process in which source code (e.g., a software application expressed in a high level programming language (e.g., C, C++, Fortran, Java) is converted into machine code (e.g., an executable in binary). Compilation usually involves the optimization of code to make it shorter and more efficient to run on a processor by the time it is converted into machine code. In source code, functions are called with particular arguments, which can be either variable or constant. The value of constant arguments can have a disproportionate effect of the execution time of the function. For example, in cases where arguments determine control flow (i.e., when constant arguments greatly influence the sequence of the execution of instructions within a particular function), execution time may vary greatly depending on the value of the constant arguments. There are two ways of optimizing the code when a function is called with constant arguments. The first is known as "inlining" the function at call sites that contain constant arguments. The second way is known as "function specialization," which involves creating a specialized version of the function that is optimized for a particular set of constant arguments and then rewriting the calls to use this version.

Both of these optimization approaches can improve performance, but can also lead to (sometimes substantial) code size increases, which can be a serious drawback in space-constrained embedded development environments. Consequently, compilers tend to not use function specialization at the "optimize-for-size" optimization level. That is, in embedded development environments, the benefits of function specialization are often not utilized due to the fact that it is highly undesirable to use such an optimization technique that could potentially increase the overall size of the optimized code. It would be desirable to be able to use the optimization provided by function specialization without disadvantageously increasing code size.

SUMMARY

An aspect of the present disclosure provides a method for compiling software code. The method may comprise scanning call sites within the code to identify a function that is called with at least one constant argument and then creating a list of each call site associated with the function and sets of constant arguments passed to the function. The method may further comprise determining whether any common subsets of the constant arguments are shared across a plurality of call sites, and then estimating a size of the function by traversing a control flow graph associated with the function. Then, the method may comprise selecting any sets of constant arguments that are each used only in one call site, estimating sizes of a specialized functions covering one or more sets of constant arguments that are each used in only one call site, and creating a first set of specialized versions of the function covering one or more sets of constant arguments that are each used in only one call site. Then, if any common subsets of the constant arguments exist, the method may include creating a second set of specialized versions of the function covering common subsets of the constant arguments that are used in the greatest number of call sites.

Another aspect of the disclosure provides a computing device with a processor, a memory, and a compiler for compiling software code. The compiler may be configured to scan call sites within the code to identify a function that is called with at least one constant argument and create a list of each call site associated with the function and sets of constant arguments passed to the function. The compiler may also determine whether any common subsets of the constant arguments are shared across a plurality of call sites and estimate a size of the function by traversing a control flow graph associated with the function. Then the compiler may select any sets of constant arguments that are each used only in one call site and estimate sizes of a specialized functions covering one or more sets of constant arguments that are each used in only one call site. The compiler may further create a first set of specialized versions of the function covering one or more sets of constant arguments that are each used in only one call site, and if any common subsets of the constant arguments exits, create a second set of specialized versions of the function covering common subsets of the constant arguments that are used in the greatest number of call sites.

Yet another aspect of the disclosure provides a non-transitory, computer-readable storage medium encoded with processor readable instructions to perform a method for compiling software code. The method may comprise scanning call sites within the code to identify a function that is called with at least one constant argument and then creating a list of each call site associated with the function and sets of constant arguments passed to the function. The method may further comprise determining whether any common subsets of the constant arguments are shared across a plurality of call sites, and then estimating a size of the function by traversing a control flow graph associated with the function. Then, the method may comprise selecting any sets of constant arguments that are each used only in one call site, estimating sizes of specialized functions covering one or more sets of constant arguments that are each used in only one call site, and creating a first set of specialized versions of the function covering one or more sets of constant arguments that are each used in only one call site. Then, if any common subsets of the constant arguments exist, the method may include creating a second set of specialized versions of the function covering common subsets of the constant arguments that are used in the greatest number of call sites.

DETAILED DESCRIPTION

Aspects of the present disclosure provide a methodology for iterative code-size aware function specialization. In compilers that use function specialization for optimization, the present disclosure adds code-size awareness in order to ensure that if the specialization of certain functions results in code exceeding a particular size, that such function specialization does not take place. Additionally, the present disclosure provides an algorithm and methodology that allows only the most beneficial, but least "expensive" specialization to take place within an acceptable code size range. In this disclosure, the terms "expensive" and/or "costly" may refer to the value of code size, with larger code size being more "expensive" regarding processing power and memory than small code size, as known in the art.

Though function specialization as a code optimization technique has existed for decades, it has not previously utilized a code-size guided heuristic. Code-size awareness, as provided in the present disclosure, is especially advantageous in embedded development environments (e.g., smartphones), which often have constrained processing and memory capabilities.

Compilation processes in general involve the translation of source code from a software application written in a high-level programming language or assembly language into machine code, which is in the form of binary and is executable by a processor. Often, the compilation process will involve some or all of the source code being translated into an intermediate representation within a compiler before it gets converted into machine code. Many optimizations may be implemented while the code is in its intermediate representation form. In the present disclosure, the size of the code refers to the resulting length of the machine code at the end of the compilation process. The overall code size of the machine code as it is loaded into memory and executed by a processor has a substantial effect on execution time. Therefore, shortening code through function specialization is one kind of optimization that can greatly improve performance.

Figure 1:
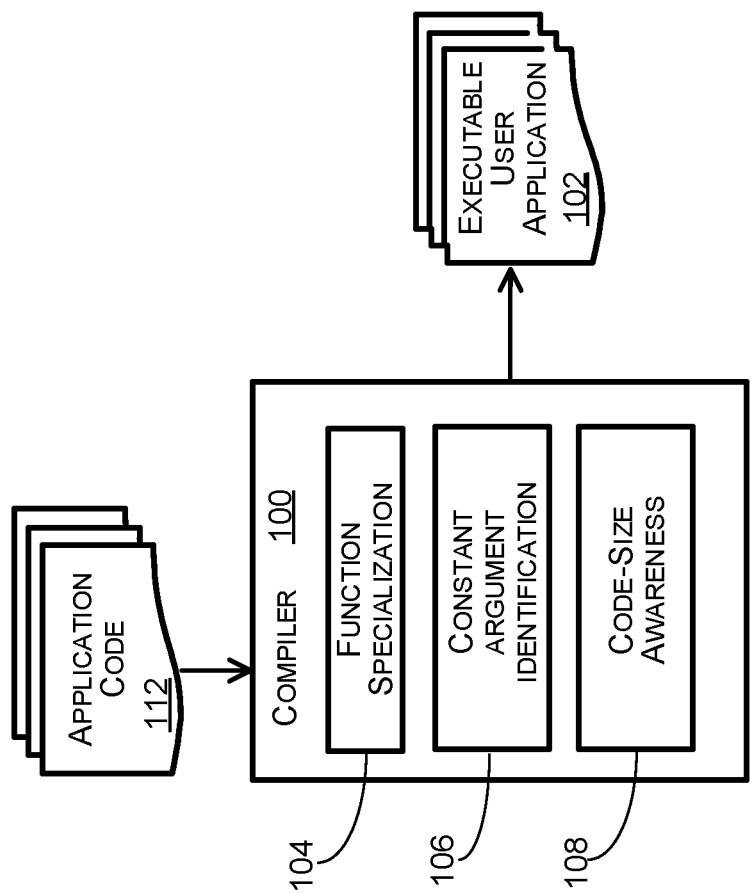
FIG. 1 is a logical block diagram showing a high-level depiction of source code going through compilation according to embodiments of the present disclosure.

FIG. 1 shows a block diagram depicting high-level aspects of a compiler 100 that generates an executable user application 102 that may be executed a computing device (not shown). The compiler 100 generally operates to generate executable code such as the executable user application 102. As one of ordinary skill in the art will appreciate, the compiler may be realized by executable code in connection with hardware that may be implemented as a part of devices such as netbooks, smartphones, tablets, and other types of developer devices. The application code 112 may be source code (e.g., prepared by a developer) that is compiled by the compiler 100 to generate the executable user application 102, which is executed by a computing device. The application code 112 may be any of a variety of application types including entertainment apps (e.g., games) and productivity apps (e.g., business-related apps). As shown in FIG. 1, the compiler 100 includes a function specialization component 104, a constant identification component 106, and a code-size awareness component 108, each of which will be described in further detail throughout this disclosure.

Figure 2:
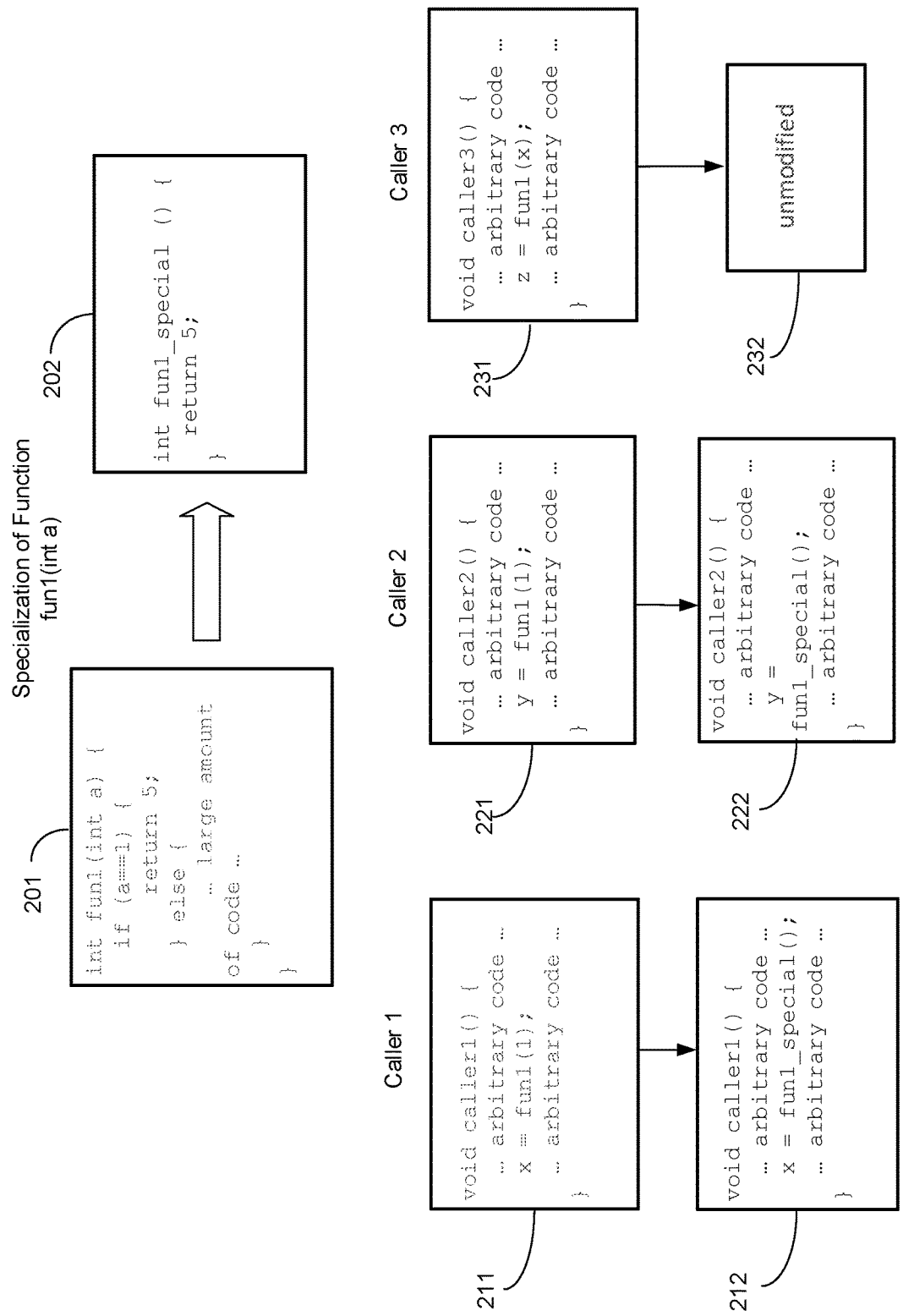
FIG. 2 depicts an example of a function being specialized for call sites containing constant arguments for the function.

Function specialization itself can be used to create shorter versions of code for functions that are sometimes (or always) called with constant arguments. FIG. 2 shows an example of a function 201 named "fun1." The full function 201 takes an integer argument represented by the variable "a," which is denoted as "int a." For the function "fun1" 201, if "a" is equal to the value "1," then "fun1" returns the number "5." The value of "1" is known as a constant argument (as opposed to a variable). If "a" is equal to anything else than "1," then "fun1" performs additional work and returns something else, denoted as " . . . large amount of code . . . " in block 201. Therefore, it is predictable that in call sites that call "fun1" with the value "1," then "fun1" will return "5," and will not execute the other portion of the function " . . . large amount of code . . . ." As a result, call sites calling "fun1" with the constant argument "1" can be specialized as shown in specialized function 202, denoted as "fun1_special( )," which always returns "5." This specialized function 202 may now be used in place of any call sites that call the function "fun1" with the constant argument "1." As shown, caller 1 contains "x=fun1(1)," at block 211 which can be replaced with the specialized function "fun1_special( )" at block 212 and will return "5" (from specialized function 202). Similarly caller 2 contains "y=fun1(1)" at block 221, which can be replaced with the specialized function "fun_1special( )" at block 222 and will return "5." Caller 3 shows an example of "fun1" being called with a variable argument "z=fun1 (x)," at block 231 wherein x is the variable, and the constant argument "1" is not called. In this case, the specialized function 202 is not used, as represented by the "unmodified" block 232. The use of specialized functions described herein can speed up execution time, but in some cases can also create code size increases that are intolerable in certain environments; this problem is addressed by embodiments of the present disclosure.

In many embodiments, the methodology may prevent specialization in cases where the overall code size of the resulting executable would exceed a pre-determined multiple of the size of the code if it contained its original functions. In some embodiments, a user (i.e., a developer) can define the maximum increase of the size of code that can be tolerated as the result of function specialization. These maximum code size increases may be set as a multiple of the original code size. For example, the user could set the maximum code size to be two times (2×), three times (3×), four times (4×), or more multiples. In some cases, no code size increase may be tolerable, in which event the code size multiple may be set to one times original size (1×). As will be described in greater detail later in this disclosure, the compiler may estimate the size of an original function and then estimate the size of a specialized version of that function as part of the methodology in order to determine whether to specialize functions.

It is contemplated that in some environments, code size is such a critical factor that no increases to it can be tolerated, and as discussed, the multiple may be set to 1×. However, even in these cases, some function specialization may still take place due to the implementation of the methodology of the present disclosure. For example, when a particular function is only called with constant arguments, and no variable ones throughout all call sites in the program, the function specialization may result in code that is the same size or smaller than the original code. Examples of such will be described in further detail later in the disclosure.

In certain embodiments, a run-time profile of an application to be compiled may available (such as in compilers using profile-guided optimization, or "PGO"). A run-time profile of an application can indicate, among other things, which call sites are used or not used, and how frequently they may be used during actual executions of a program. Run-time profiles of programs are commonly available in general purpose computing environments (e.g., on a desktop computer), and are less commonly accessible in embedded development environments (e.g., in smartphones), but it is possible to use the run-time profiles in either kind of environment in conjunction with embodiments of the present disclosure.

A run-time profile may be used to determine whether a particular function is called frequently. If a particular function is called frequently, it may be worthwhile to specialize the function, even if the specialized function is somewhat large in size in comparison to the overall allotted code size budget. That is, for a given code-size multiple of the overall code (e.g., 2×, 3×, etc.), if a function still creates large code size, but it is called very frequently, it may still be specialized as long as its specialization does not result in exceeding the overall code size multiple. An analysis of the run-time profile may be used to determine whether the trade-off between function specialization and resulting code size would be desirable. This analysis may weigh, among other things, the cost against the benefits of function specialization. In some embodiments, this cost/benefit analysis may still allow for somewhat large code sizes that might otherwise be a concern in instances where the functions that are specialized are ones that are frequently executed. Because run-time profiles provide information about which functions are actually executed, and how frequently, a compiler utilizing the methodology of the present disclosure may accurately estimate how the specialization of certain functions will impact overall code size. In embodiments where a run-time profile is not available, the compiler may have to assume that each function in the source code is called, and may estimate the code size that would result from specialization.

One aspect of the disclosure is that the compiler, in some embodiments, can abandon the application of the function specialization optimization early if it can estimate that specialization of any functions is impossible given the constraints. Such early termination can save overall compilation time because the feasibility of function specialization optimization can be determined early on in the process. In implementations where a run-time profile is available, the compiler can first analyze whether the most frequently executed functions may be specialized within the given code size constraints, which can give an early indication of whether the function specialization should be attempted.

Figure 3:
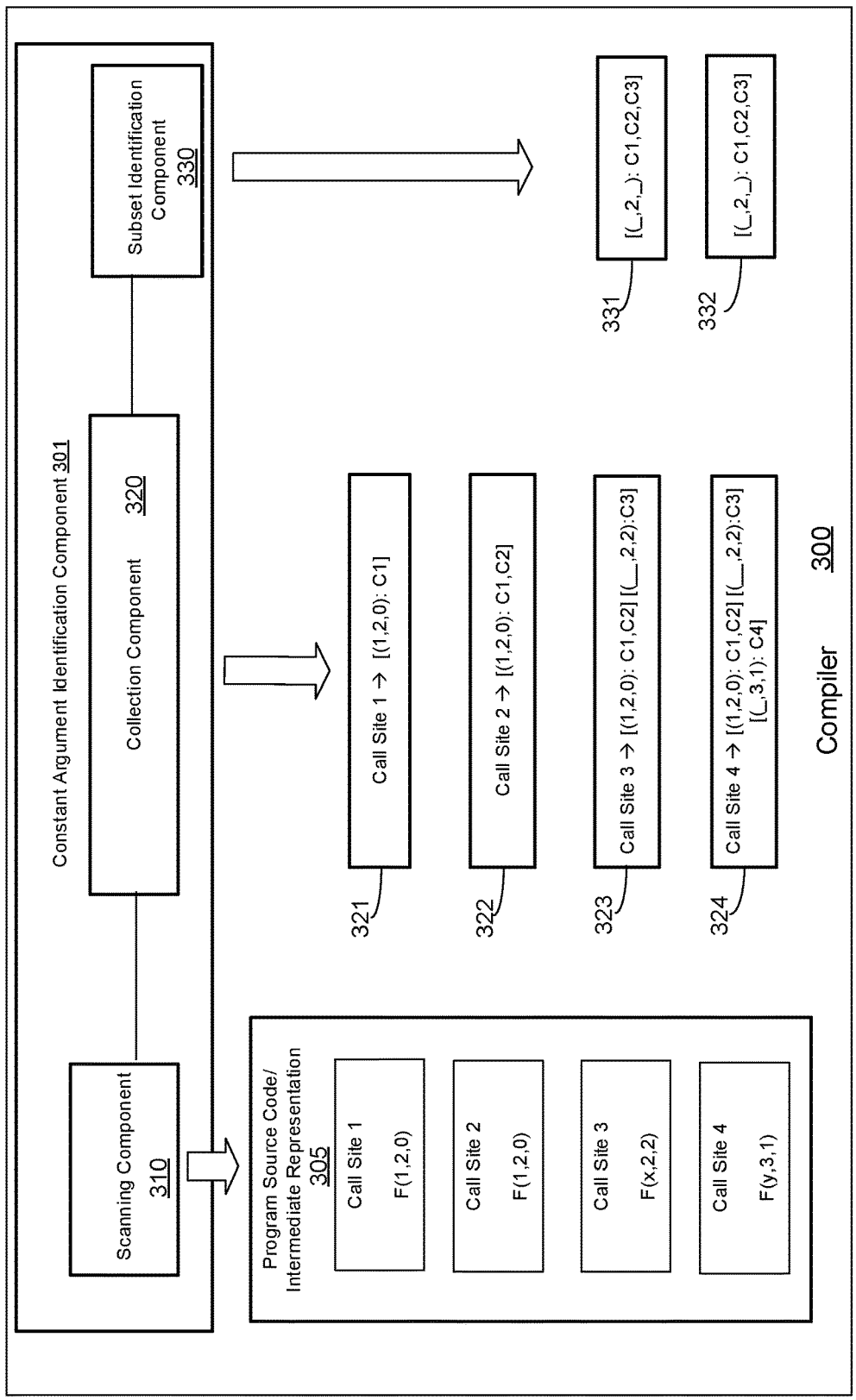
FIG. 3 is a logical block diagram depicting components that may execute aspects of the code-size aware function specialization of the present disclosure.

FIG. 3 is a logical block diagram depicting components that may implement code-size awareness as a heuristic for determining whether function specialization should be used to optimize a particular function. An aspect of the present disclosure is that the methodology may produce the minimum number of specialized versions of a function while maximizing the number of call sites that are covered by each specialized version.

Figure 4:
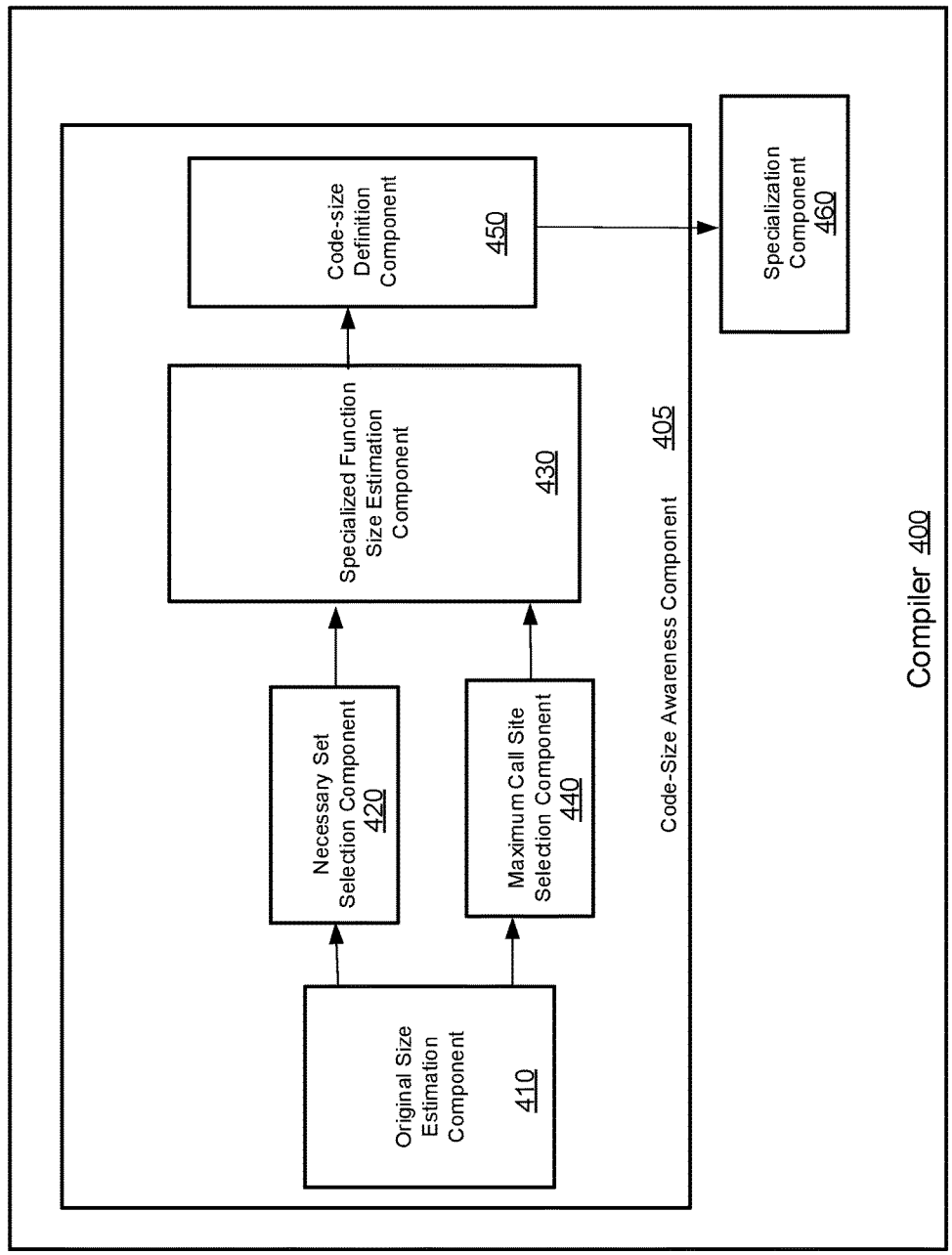
FIG. 4 is another logical block diagram depicting additional components that may execute aspects of the code-size aware function specialization of the present disclosure.

FIG. 3 shows both logical blocks that may perform actions on code as well as representations of structures that may exist in code. FIG. 3 is not intended to be a hardware diagram and is only used to conceptually illustrate aspects of the present disclosure. The components of FIG. 3 may be implemented in hardware alone, software alone, or a combination of hardware and software. Both FIGS. 3 and 4 are logical blocks of the same compiler (shown as compiler 300 and 400, respectively) each depicting a different aspect of the methodology of the present disclosure. FIG. 3 depicts several sub-components that implement the constant argument identification components 301 (also shown in FIG. 1 at 106) and FIG. 4 depicts several sub-components that implement the code-size awareness component 405 (also shown in FIG. 1 at 108) As shown in FIG. 3, the compiler 300 may contain a scanning component 310 that scans all call sites (i.e., lines of code) of internal functions that contain any constant arguments. Program source code/intermediate representation 305 depicts an example portion of code that has call sites 1, 2, 3, and 4, which may also be referred to as C1, C2, C3, and C4. As shown, these call sites may contain constant arguments alone, such as call sites 1 and 2, where the function is called with only constant arguments (1,2,0). Additionally, call sites 3 and 4 call functions with constant arguments, but also pass variables as arguments. For example, call site 3 calls a function with arguments (x,2,2,), in which the first argument is a variable (x) and the second and third arguments are the constants 2 and 2, respectively. Similarly, call site 4 calls a function with arguments (y,3,1), in which the first argument is a variable (y) and the second and third arguments are 3 and 1, respectively. The compiler 300 may then, at a collection component 320, collect all sets of constant arguments 321-324 that are passed to a particular function, as well as the call sites using them into a list or table or similar data structure. Blocks 321-324 represent a sequential building of a list (e.g., by collection component 320) of constant arguments as each of the call sites (shown in program source code 305) are scanned. Block 321 shows that at call site 1, the function is called with three constant arguments, which are (1,2,0). Block 322 shows that at call site 2, the function is again called with the same constant arguments, which are (1,2,0). The concept of the list being built at this point is depicted as [(1,2,0): C1, C2]. Block 323 shows that at call site 3, the function is called with arguments that are different in part from C1 and C2; the new arguments are (_,2, 2) where "_" denotes a non-constant (variable) argument While the compiler collects all sets of constant arguments in a list via the collection component 320, it may also determine common subsets of constant arguments shared across multiple call sites, as depicted by the subset identification component 330. Based on the scanning of call sites 1, 2, and 3 at Block 323, the compiler can determine that each of the call sites share one common constant argument; Block 231 shows that C1, C2, and C3 all share the same second constant argument of 2 while the other two arguments vary. The concept of a common subset (the constant "2") being shared across these three call sites is depicted as [(_,2,_): C1, C2, C3]. Turning back to the collection component 320, shown at Block 324 is a list of all the sets of constant arguments at C1, C2, C3, and C4. At C4, the function is called with arguments (_,3,1), which is entirely different from the constant arguments at C1, C2, and C3. Therefore, at the subset identification component 330, Block 332 shows that the common subsets of constant arguments does not add anything new due to the common subset identified at Block 331.

Ideally, all functions in source code that are called with constant arguments could have a specialized function. However, as discussed previously, specializing all of the functions may increase the overall code size to an undesirable level. Therefore, aspects of the present disclosure are implemented in order to prioritize the specializations of functions at call sites that 1) contain unique constant arguments and 2) cover the largest common subsets of constant arguments across multiple call sites. Implementing function specialization with these considerations in mind allows the deletion of original functions at the end of the function specialization process.

In order to determine which function specializations would be most beneficial to optimize the code while keeping the code size below a pre-determined size threshold. FIG. 4 is another logical block diagram depicting components that together may determine which functions to specialize via the code size specialization component 405. The compiler 400, via the original size estimation component 410 may estimate the size of the original function by traversing a control flow graph (CFG) associated with the function. As known in the art, a control flow graph is a representation of how a function is executed in terms of the order of its basic blocks. Basic blocks are made up of instructions, and at the end of every basic block is a control flow decision which directs the execution to either jump directly to the next basic block or to another block in a different location. The number of instructions influences how long the function may be, so the original size estimation component 410 may estimate function size by counting every instruction encountered within an original function.

Then, the compiler 400 may select all necessary sets of constant arguments for which a function would have to be specialized if the particular function is to be specialized to cover all call sites, via necessary set selection component 420. These are the sets of constant arguments that are not covered by a subset of constant arguments identified by the subset identification component 330. For example, turning back to FIG. 3, if the function that is called with the constant arguments at call sites 1-4 is to be specialized, a specialized function for C4, which contains the constant arguments (_,3,1), would need to be created. If a function specialization were to be created without using the constant arguments contained in C4, then the original (non-specialized) function would have to be kept intact in the program, resulting in a large code size increase. Before creating this specialized function for the constant arguments of C4, though, the compiler may estimate the size of the function specialization for the constant arguments at C4. This may be done via the specialized function size estimation component 430, which retraces the CFG of the function, this time using the constant arguments identified for the particular call site, which in the present example are (_,3,1). By using the actual constant arguments, the specialized function size estimation component 430 can resolve branches that would not be utilized in the original code due to the actual arguments that are passed to the function. As a result, the specialized function size estimation component 430 can discount instructions that can be eliminated where possible to determine an estimated size of the resulting code. Once the estimated size of the specialized function for the call site C4 has been determined, the compiler may compare, via the code-size definition component 450, whether the specialized function size is small enough in comparison to a pre-determined code size. A user may utilize the code-size definition component 450 in order to set a desired multiple of overall code size. As previously mentioned, the overall code size may have a code size budget comprising a multiple of the original (non-specialized) code size such as 1×, 2×, 3×, 4×, etc.

If the unique (i.e., "necessary") constant arguments have had a function specialized for its call sites and there is still room for additional function specialization in the code size budget, then the maximum call site selection component 440 may be utilized to select a set of call sites that covers common subset of constant arguments. For example, turning back to FIG. 2, the common subset of constant arguments that covers multiple call sites is (_,2,_), as shown in Block 2. By specializing only for the set of arguments (_,2,_), three different call sites, C1, C2, and C3, now have a specialization. If there are multiple sets of constant arguments to choose from, the maximum call site selection component 440 may select the set that covers the most call sites in order to minimize the number of specializations required. Before creating the specialized function for the common constant arguments, the specialized function size estimation component 430 may estimate the size of the specialized function by retracing the CFG using the common constant argument. Then the compiler may compare the estimated specialized function size to the pre-determined maximum code size via the code-size definition component 450, and if the specialized function does not exceed the pre-determined maximum code size, the compiler may specialize the function at the specialization component 460.

If there is still code size budget available, the process of selecting all necessary sets and/or selecting common subsets of arguments from multiple sets may be repeated until all call sites are covered, or until the combined size of specializations exceeds the pre-determined code size. Finally, if all call sites are covered by specializations, the compiler may delete the original function in order to remove the excess code that has now been rendered unnecessary.

In addition to the steps outlined above, other embodiments of the present disclosure may include further optimization steps. For example, in embodiments using run-time profiles, the profile data can be used to select sets of arguments that cover the most frequently used call sites instead of or in addition to simply selecting common subsets of constant arguments that cover multiple call sites. It is contemplated that if there are two possible call sites using the same constant arguments for which a function could be specialized, the one that is used more frequently during run time would be more advantageous to specialize, even if the code size of that specialization were larger than the code size of the specialization of the less-frequently used call site. Conversely, constant arguments that only appear in call sites that are used infrequently, or not at all, can be left unspecialized.

In some embodiments, the methodology may include placing specialized versions of a function closer to their callers to improve locality. That is, the specialized version of a function for a particular call site may be placed in machine code closer to its call site than it otherwise would normally be placed. Placing the specialized function closer to its caller can improve the performance of actual machine code execution due to the fact that most processors have an instruction cache (I-Cache) into which code is loaded from memory. Machine code is typically loaded sequentially in fixed-size chunks from memory into the cache, and if a particular call site is loaded and its specialized function is located nearby in the code, it is more likely that the specialized function will already be in the cache when a call to it is executed.

Figure 5:
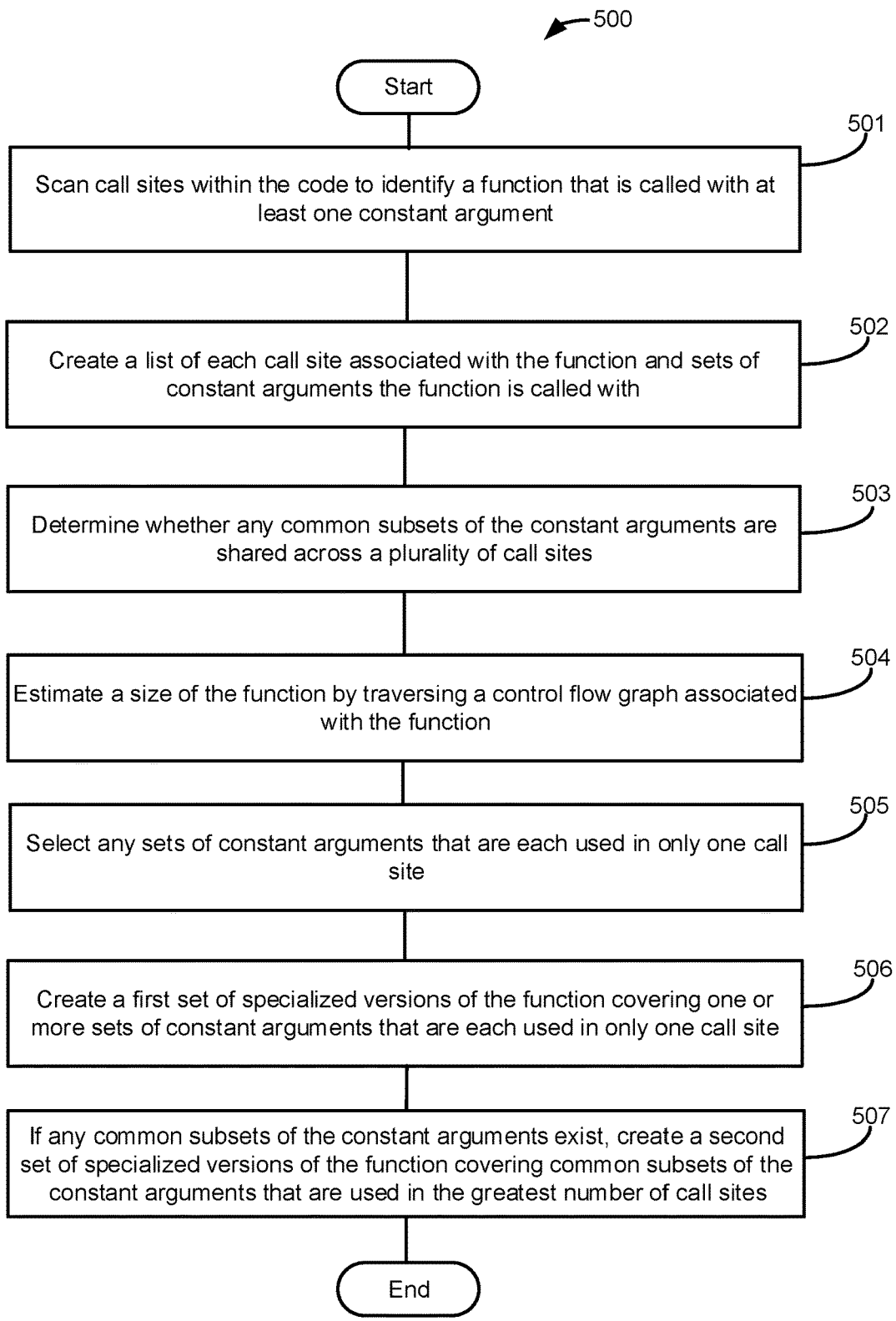
FIG. 5 is a flowchart depicting a method for compiling source code using code-size aware function specialization according to the present disclosure.

FIG. 5 is a flowchart which may be traversed to implement a method 500 of code optimization. Simultaneous reference may be made to FIGS. 3 and 4 to provide examples of components that may implement aspects of the method 500. The method 500 may first include scanning call sites (e.g., by the scanning component 310) within the code to identify a function that is called with at least one constant argument at step 501. Then, the method 500 many include creating a list (e.g., by the collection component 320) of each call site comprising the function and sets of arguments called by the function at step 502. Next, the method 500 may comprise determining whether any common subsets of the constant arguments are shared across a plurality of call sites (e.g., by the subset identification component 330) at step 503. The method may include estimating a size of the function (e.g., by the original size estimation component 410) by traversing a control flow graph associated with the function at step 504. The method may include selecting any sets of constant arguments that are used in only one call site (e.g., by the necessary set selection component 420) at step 505. Then, the method may include creating a first set of specialized versions of the function covering one or more sets of constant arguments that are used in only one call site (e.g., by the specialization component 460) at step 506. The method may also include creating, if any common subsets of the constant arguments exist, a set of specialized versions of the function covering common subsets of the constant arguments that are used in the greatest number of call sites (e.g., by the maximum call site selection component 440 in conjunction with the specialization component 460) at step 507.

Figure 6:
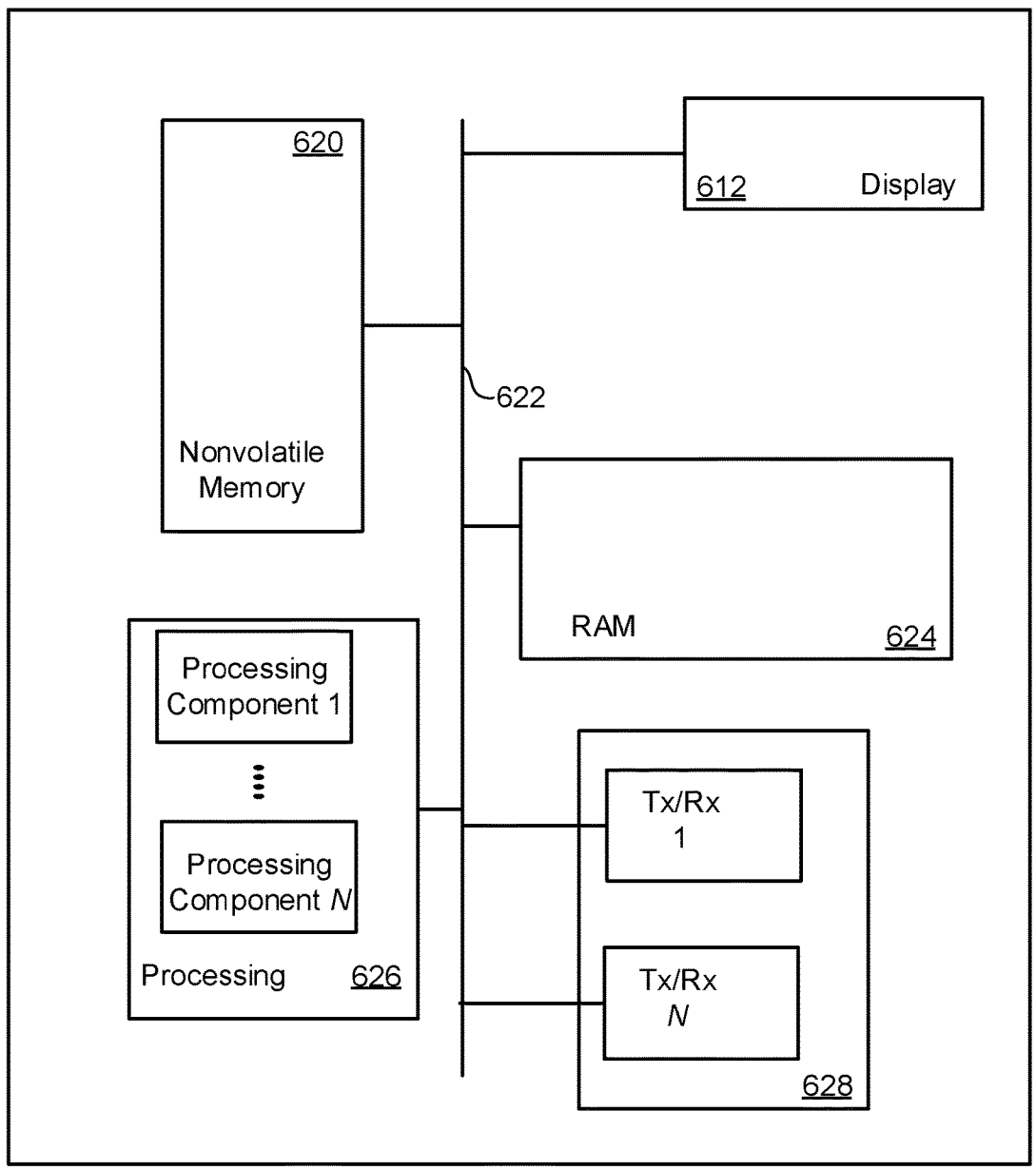
FIG. 6 is a logical block diagram depicting a computing device and hardware components thereof that may implement aspects of the present disclosure.

Referring to FIG. 6, shown is a block diagram depicting exemplary physical components that may be used in connection with realizing the components depicted in FIGS. 1, 3, and 4. As shown, a display portion 612, and nonvolatile memory 620 are coupled to a bus 622 that is also coupled to random access memory ("RAM") 624, a processing portion (which includes N processing components) 626, and a transceiver component 628. Although the components depicted in FIG. 6 represent physical components of a computing device (that may be used to realize the compiler 100 depicted in FIG. 1) it is not intended to be a hardware diagram; thus many of the components depicted in FIG. 6 may be realized by common constructs or distributed among additional physical components. Moreover, it is certainly contemplated that other existing and yet-to-be developed physical components and architectures may be utilized to implement the functional components described with reference to FIG. 1.

In general, the nonvolatile memory 620 functions to store (e.g., persistently store) data and executable code including code that is associated with the functional components depicted in FIG. 1. In some embodiments of the computing device depicted in FIG. 1 for example, the nonvolatile memory 620 includes bootloader code, modem software, operating system code, file system code, and non-transitory processor executable instructions to implement the compiler 100.

In many implementations, the nonvolatile memory 620 is realized by flash memory (e.g., NAND or ONENAND™ memory), but it is certainly contemplated that other memory types may also be utilized. Although it may be possible to execute the non-transitory code from the nonvolatile memory 620, the executable code in the nonvolatile memory 620 is typically loaded into RAM 624 and executed by one or more of the N processing components in the processing portion 626.

The N processing components 626 in connection with RAM 624 generally operate to execute the instructions stored in nonvolatile memory 620 to effectuate the functional components depicted in FIG. 1. As one of ordinarily skill in the art will appreciate, the processing components 626 may include multiple processor cores (e.g., cores 116) a video processor, modem processor, DSP, graphics processing unit (GPU), MDP, and other processing components.

The depicted transceiver component 628 includes N transceiver chains for communicating with external devices. Each of the N transceiver chains represents a transceiver associated with a particular communication scheme. For example, one transceiver chain may operate according to wireline protocols, another transceiver may communicate according to WiFi communication protocols (e.g., 802.11 protocols), another may communicate according to cellular protocols (e.g., CDMA or GSM protocols), and yet another may operate according to Bluetooth protocols. Although the N transceivers are depicted as a transceiver component 628 for simplicity, it is certainly contemplated that the transceiver chains may be separately disposed about the mobile computing device.

This display 612 generally operates to provide text and non-text content (e.g., UI animations) to a user. Although not depicted for clarity, one of ordinary skill in the art will appreciate that other components including a display driver and backlighting (depending upon the technology of the display) are also associated with the display 612.

The architecture depicted in FIG. 6 is exemplary only and one or more of the various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, or microcontroller. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for compiling software code, the method comprising:
   scanning call sites within the code to identify a function that is called with at least one constant argument;
   creating a list of each call site associated with the function and sets of constant arguments called by the function;
   determining whether any common subsets of the constant arguments are shared across a plurality of call sites;
   estimating an executable code size of the function by traversing a control flow graph associated with the function;
   selecting any subsets of constant arguments that are each used only in one call site;
   estimating an executable code size of a specialized function covering one or more subsets of constant arguments that are each used in only one call site prior to creating any specialized version of any functions;
   creating a first set of specialized versions of the function covering one or more subsets of constant arguments that are each used in exactly one call site,
   if it is determined that a plurality of common subsets of the constant arguments exist across the plurality of call sites, creating a second set specialized versions of the function covering the plurality of common subsets of the constant arguments that are used in the greatest number of call sites.

2. The method of claim 1, wherein:
   the size of the first and second sets of specialized functions does not result in a size of executable code exceeding a pre-determined code size.

3. The method of claim 2, further comprising:
   creating additional specialized functions until either all constant arguments used at call sites of the function have specialized functions or a combined size of all specialized functions exceeds the pre-determined code size.

4. The method of claim 1, wherein:
   the estimating a size of the function by traversing a control flow graph comprises counting each instruction of the function.

5. The method of claim 1, wherein if all constant arguments passed to the function at each call site are covered by a specialized function, the method further comprises:
   deleting the function.

6. The method of claim 1, wherein a run-time profile of the code is available, and wherein the method further comprises:
   selecting one or more sets of arguments that are used in call sites of the function most frequently based on the run-time profile; and
   specializing the function for the one or more sets of arguments.

7. The method of claim 1, further comprising:
   placing the specialized versions of the function closer to their call sites in executable code than they would be placed without function specialization.

8. A computing device comprising a processor, a memory, and a compiler for compiling software code, wherein the compiler is configured to:
   scan call sites within the code to identify a function that is called with at least one constant argument;
   create a list of each call site associated with the function and sets of constant arguments passed to the function;
   determine whether any common subsets of the constant arguments are shared across a plurality of call sites;
   estimate an executable code size of the function by traversing a control flow graph associated with the function;
   select any subsets of constant arguments that are each used only in one call site;
   estimate an executable code size of a specialized function covering one or more subsets of constant arguments that are each used in only one call site prior to creating any specialized version of any functions;
   create a first set of specialized versions of the function covering one or more subsets of constant arguments that are each used in exactly one call site, if it is determined that a plurality of common subsets of the constant arguments exist across the plurality of call sites, create a second set specialized versions of the function covering the plurality of common subsets of the constant arguments that are used in the greatest number of call sites.

9. The computing device of claim 8, wherein:
the size of the first and second sets of specialized functions does not result in a size of executable code exceeding a pre-determined code size.

10. The computing device of claim 8, wherein the compiler is further configured to:
create additional specialized functions until either all constant arguments used at call sites of the function have specialized functions or a combined size of all specialized functions exceeds the pre-determined code size.

11. The computing device of claim 8, wherein:
the estimating a size of the function by traversing a control flow graph comprises counting each instruction of the function.

12. The computing device of claim 8, wherein if all constant arguments passed to the function at each call site are covered by a specialized function, the compiler is further configured to:
delete the function.

13. The computing device of claim 8, wherein a run-time profile of the code is available, and wherein the compiler is further configured to:
select one or more sets of arguments that are used in call sites of the function most frequently based on the run-time profile; and
specialize the function for the one or more sets of arguments.

14. The computing device of claim 8, wherein the compiler is further configured to:
place the specialized versions of the function closer to their call sites in executable code than they would be placed without function specialization.

15. A non-transitory, tangible computer readable storage medium, encoded with processor readable instructions to perform a method for compiling software code, the method comprising:
scanning call sites within the code to identify a function that is called with at least one constant argument;
creating a list of each call site associated with the function and sets of constant arguments called by the function;
determining whether any common subsets of the constant arguments are shared across a plurality of call sites;
estimating an executable code size of the function by traversing a control flow graph associated with the function;
selecting any subsets of constant arguments that are each used only in one call site;
estimating an executable code size of a specialized function covering one or more subsets of constant arguments that are each used in only one call site prior to creating any specialized version of any functions;
creating a first set of specialized versions of the function covering one or more subsets of constant arguments that are each used in exactly one call site,
if it is determined that a plurality of common subsets of the constant arguments exist across the plurality of call sites, creating a second set specialized versions of the function covering the plurality of common subsets of the constant arguments that are used in the greatest number of call sites.

16. The non-transitory, tangible computer readable storage medium of claim 15, wherein:
the size of the first and second sets of specialized functions does not result in a size of executable code exceeding a pre-determined code size.

17. The non-transitory, tangible computer readable storage medium of claim 15, wherein the method further comprises:
creating additional specialized functions until either all constant arguments used at call sites of the function have specialized functions or a combined size of all specialized functions exceeds the pre-determined code size.

18. The non-transitory, tangible computer readable storage medium of claim 15, wherein:
the estimating a size of the function by traversing a control flow graph comprises counting each instruction of the function.

19. The non-transitory, tangible computer readable storage medium of claim 15, wherein a run-time profile of the code is available, and wherein the method further comprises:
selecting one or more sets of arguments that are used in call sites of the function most frequently based on the run-time profile; and
specializing the function for the one or more sets of arguments.

20. The non-transitory, tangible computer readable storage medium of claim 15, wherein the method further comprises:
placing the specialized versions of the function closer to their call sites in executable code than they would be placed without function specialization.

* * * * *